(12) United States Patent
Qian et al.

(10) Patent No.: US 10,800,927 B2
(45) Date of Patent: Oct. 13, 2020

(54) AQUEOUS EMULSION PAINT WITH IMPROVED STAIN REMOVAL AND ANTICLOGGING PROPERTIES

(71) Applicants: Dow Global Technologies LLC, Midland, MI (US); Rohm and Haas Company, Philadelphia, PA (US)

(72) Inventors: Zhen Qian, Anhui (CN); Xuzhi Zhu, Shanghai (CN); Jianming Xu, Shanghai (CN); Qingwei Zhang, Shanghai (CN); Wei Cui, Shanghai (CN); Jintao Liu, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 129 days.

(21) Appl. No.: 15/535,519

(22) PCT Filed: Dec. 22, 2014

(86) PCT No.: PCT/CN2014/094536
§ 371 (c)(1),
(2) Date: Jun. 13, 2017

(87) PCT Pub. No.: WO2016/101105
PCT Pub. Date: Jun. 30, 2016

(65) Prior Publication Data
US 2017/0335116 A1 Nov. 23, 2017

(51) Int. Cl.
*C09D 5/02* (2006.01)
*C09D 125/14* (2006.01)
*C09D 133/08* (2006.01)
*C09D 133/14* (2006.01)

(52) U.S. Cl.
CPC .............. *C09D 5/027* (2013.01); *C09D 5/02* (2013.01); *C09D 5/028* (2013.01); *C09D 125/14* (2013.01); *C09D 133/08* (2013.01); *C09D 133/14* (2013.01)

(58) Field of Classification Search
CPC .......... C09D 5/027; C09D 5/02; C09D 5/028; C09D 125/14; C09D 133/08; C09D 133/14
USPC ....................................................... 524/558
See application file for complete search history.

(56) References Cited

U.S. PATENT DOCUMENTS

| | | | |
|---|---|---|---|
| 3,356,627 A * | 12/1967 | Scott | C08F 20/34 524/516 |
| 5,530,056 A | 6/1996 | Farwaha et al. | |
| 6,025,449 A * | 2/2000 | Enomoto | C08F 220/18 524/558 |
| 6,610,776 B2 | 8/2003 | Laubender et al. | |
| 7,893,131 B2 * | 2/2011 | Matthews | C09D 143/02 523/172 |
| 8,791,190 B2 | 7/2014 | Pressley et al. | |
| 8,993,667 B2 | 3/2015 | Rokowski et al. | |
| 2001/0031826 A1 * | 10/2001 | Laubender | C04B 41/009 524/558 |
| 2002/0123588 A1 | 9/2002 | Adam et al. | |
| 2009/0004394 A1 * | 1/2009 | Koller | C09D 133/14 427/385.5 |
| 2012/0277334 A1 | 11/2012 | Zhang et al. | |
| 2014/0005322 A1 | 1/2014 | Akkerman et al. | |
| 2014/0235780 A1 | 8/2014 | Rokowski et al. | |

FOREIGN PATENT DOCUMENTS

| | | | | |
|---|---|---|---|---|
| AU | 20100340375 A1 | 7/2011 | | |
| WO | 2013119521 A1 | 8/2013 | | |
| WO | WO-2013119521 A1 * | 8/2013 | ........... | C09D 133/08 |
| WO | 2014056184 A1 | 4/2014 | | |

OTHER PUBLICATIONS

Brandrup, J., Immergut, E.H., Grulke, E.A.; Polymer Handbook, vol. 1, (1999), pp. VI/193-VI/277.

* cited by examiner

*Primary Examiner* — Kelechi C Egwim
(74) *Attorney, Agent, or Firm* — Karl E. Stauss; Cantor Colburn LLP

(57) ABSTRACT

The present invention provides an aqueous composition for coating substrates comprising: one or more emulsion copolymer, the emulsion copolymer being a copolymerization product of a monomer mixture comprising a monomer of formula I,

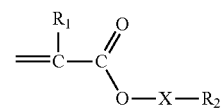

wherein R1 is hydrogen or methyl, X is a divalent organic alkylene oxide group, n is an integer ranging from 1 to 50 and R2 is hydrogen or an aliphatic or aromatic hydrocarbon group having from 1 to 20 carbon atoms, and a phosphate surfactant. When incorporated into a coating composition, the coating composition show both improved stain-resistance properties and anti-clogging properties.

19 Claims, No Drawings

AQUEOUS EMULSION PAINT WITH IMPROVED STAIN REMOVAL AND ANTICLOGGING PROPERTIES

INTRODUCTION

This invention relates to a polymer composition that can be used in a wide range of coating applications, such as aqueous emulsion paint. Polymer compositions of the present invention contain aqueous emulsion copolymers, when used to make paint products, having an improved stain removal abilities and anti-clogging capabilities.

Efforts have been carried out to form improved polymer compositions that, when introduced into a paint formulation, reduces the penetration of adhering staining substances on the coated surfaces thereby improving the stain removal ability of the resulting coating surface. For example, phosphate surfactants, such as RHODAFAC RS-610 (available from Rhodia), have been known to be added into paint formulations to improve stain resistance properties. However, when this type of phosphate surfactant is employed in the paint formulation, increased brush clogging phenomenon has been observed. On the other hand, when other surfactants, such as 15-S-40 (available as TERGITOL® from The Dow Chemical Company), is used, while brush clogging was reduced, but stain resistance performance was compromised. Thus, there remains a need to develop a polymer composition that, when incorporated in coating formulations, achieves performance balance in stain resistance and anti-clogging properties.

Accordingly, the present provides an aqueous polymer composition with a further balanced improvement in stain resistance and anti-clogging properties, suitable to be used in elastomeric coatings, such as paints, and aqueous coating compositions.

SUMMARY OF INVENTION

The present invention relates aqueous compositions for coating substrates comprising: (i) one or more emulsion copolymer, the emulsion copolymer being a copolymerization product of a monomer mixture comprising a monomer of formula I.

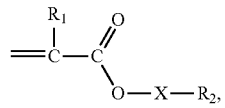

wherein $R^1$ is hydrogen or methyl, X is a divalent organic alkylene oxide group, n is an integer ranging from 1 to 50 and $R^2$ is hydrogen or an aliphatic or aromatic hydrocarbon group having from 1 to 20 carbon atoms, and (ii) a phosphate surfactant.

Preferably, the aqueous composition as described above, such that the monomer mixture contains at least 0.3 wt. %, preferably 2 wt. %, of monomers of the formula I.

Preferably, the aqueous compositions as described above, such that the monomer mixture further comprises one or more C2 to C8 acrylates or alkyl (meth)acrylates.

Preferably, the aqueous compositions as described above, such that the monomer mixture further comprises one or more hard vinyl monomers. And preferably, the hard vinyl monomer is a styrene or a (meth)acrylic ester monomer.

Preferably, the aqueous compositions as described above, such that the phosphate surfactant is polyethylene glycol monotridecyl ether phosphate. Preferably, the phosphate surfactant comprises from 0.3 to 3 wt. % based on the total dry weight of the aqueous composition.

In another aspect of the present invention, a pigmented coating material comprising: (a) or more emulsion copolymer, the emulsion copolymer being a copolymerization product of a monomer mixture comprising a monomer of formula I

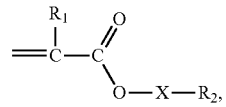

such that $R^1$ is hydrogen or methyl, X is a divalent organic alkylene oxide group, n is an integer ranging from 1 to 50 and $R^2$ is hydrogen or an aliphatic or aromatic hydrocarbon group having from 1 to 20 carbon atoms, and (b) a phosphate surfactant, and (c) a combination of one or more of a pigment, extender, filler and mixtures thereof with one or more hydrophilic polymeric dispersant in a total amount so that the compositions have a pigment volume concentration (% PVC) of from 20 to 70.

Preferably, the pigmented coating material as described above, such that the monomer mixture contains at least 0.3 wt. %, preferably 2 wt. %, of monomers of the formula I.

Preferably, the pigmented coating material as described above, such that the monomer mixture further comprises one or more C2 to C8 alkyl (meth)acrylates.

Preferably the pigmented coating material as described above, such that the monomer mixture further comprises one or more hard vinyl monomers. And preferably, the hard vinyl monomer is a styrene or a (meth)acrylic ester monomer.

Preferably, the pigmented coating material as described above, such that the phosphate surfactant is polyethylene glycol monotridecyl ether phosphate. Preferably, the phosphate surfactant comprises from 0.3 to 3 wt. % based on the total dry weight of the aqueous composition.

In another aspect of the present invention, a method of making compositions for coating substrates comprising: A method of making a composition for coating substrates comprising: forming a copolymer, using emulsion polymerization, from a monomer mixture comprising, based on the total dry weight of the monomer mixture, (a) 0.3 wt. % to 3.0 wt. % of a monomer of the formula I

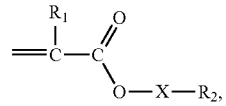

wherein $R^1$ is hydrogen or methyl, X is a divalent organic alkylene oxide group, n is an integer ranging from 1 to 50 and $R^2$ is hydrogen or an aliphatic or aromatic hydrocarbon group having from 1 to 20 carbon atoms, Tg from −20° C. to 50° C., (b) a hard monomer comprises styrene or vinyl aromatic monomer one or more or C1 to C8 alkyl (meth) acrylates, (c) a soft monomer comprises acrylate monomer C2 to C8 acrylates or C2 to C8 alkyl acrylate, and (d) 0.3 wt. % to 3.0 wt. % of a phosphate surfactant; combining the copolymer with a reductant and a combination of one or more of a pigment, extender, filler and mixtures thereof, and one or more hydrophilic polymeric monomer or dispersant, so that the aqueous composition has a pigment volume concentration (% PVC) of from 20 to 70.

DETAILED DESCRIPTION

Unless otherwise indicated, all temperature and pressure units are room temperature and standard pressure.

All phrases comprising parentheses denote either or both of the included parenthetical matter and its absence. For example, the phrase "(meth)acrylate" includes, in the alternative, acrylate and methacrylate.

As used herein, the term "ASTM" refers to publications of ASTM International, Conshohocken, Pa.

Unless otherwise indicated, as used herein, the term "glass transition temperature" or "Tg" refers to the mid-point glass transition temperature of a polymer as determined by differential scanning calorimetry, in accordance with ASTM E-1356 (1991), with a ramp rate of 20° C./minute.

As used herein, unless otherwise indicated, the term "calculated Tg" or "calculated glass transition temperature" refers to the Tg of a polymer calculated by using the Fox equation (T. G. Fox, *Bull. Am. Physics Soc.*, Volume 1, Issue No. 3, page 123 (1956). For reference and use in calculating a Tg, a comprehensive compilation of available data describing glass transition temperatures of homopolymers from suitable monomers can be found in *Polymer Handbook*, Vol. 1, editors Brandrup, J.; Immergut, E. H.; Grulke, E. A., 1999, pages VI/193-277.

As used herein, the term "(meth)acrylate" means acrylate, methacrylate, and mixtures thereof and the term "(meth)acrylic" used herein means acrylic, methacrylic, and mixtures thereof.

As used herein, the term "pigment volume concentration" or "% PVC" refers to the quantity calculated by the following formula:

$$PVC(\%) = \frac{\left(\begin{array}{c}\text{volume of pigments(s)} + \\ \text{volume extenders(s)} + \text{volume of fillers(s)}\end{array}\right)}{\text{Total dry volume of coating}} \times 100.$$

As used herein, the term "polymer" refers to, in the alternative, to a polymer made from one or more different monomer, such as a copolymer, a terpolymer, a tetrapolymer, a pentapolymer etc., and may be any of a random, block, graft, sequential or gradient polymer.

As used herein, the term "hard vinyl monomer" means any monomer which would if polymerized to yield a homopolymer having a weight average molecular weight of 50,000 or greater form such a homopolymer with a glass transition temperature of 10° C. or more, or, preferably, 25° C. or more. Examples of hard vinyl monomers include (meth)acrylonitrile, methyl methacrylate, ethyl methacrylate, isopropyl methacrylate, and styrene and vinyl aromatic monomer.

As used herein, the term "soft monomer" refers to any $C_2$ to $C_8$ alkyl (meth)acrylate monomer which would, if polymerized, yield a homopolymer having a weight average molecular weight of 50,000 or greater. Such a homopolymer has a glass transition temperature of −20° C. or less, or, preferably, −30° C. or less. Examples include almost any $C_2$ to $C_8$ alkyl (meth)acrylate, t-butyl acrylate, n-hexadecyl acrylate, 2-ethylhexyl acrylate, neopentyl acrylate, isobornyl acrylate, butyl methacrylate, and isobutyl methacrylate.

As used herein, the term "total emulsion copolymer solids" refers to the copolymerized monomers, chain transfer agents, and surfactants in a given emulsion copolymer composition.

As used herein, the term "total solids in the monomer mixture" refers to monomers as well as to reactive materials, such as chain transfer agents.

As used herein, the term "total composition solids" refers to everything in the composition other than water and volatile solvents.

As used herein, unless otherwise indicated, the term "average particle size" means a weight average particle size as determined by light scattering (LS) using a BI-90 particle size analyzer (Brookhaven Instruments Corp. Holtsville, N.Y.).

As used herein, the term "weight average molecular weight" or "MW" refers to the weight average molecular weight as measured by aqueous gel permeation chromatography (GPC) against a polyacrylic acid (PAA) standard of a copolymer that is hydrolyzed in KOH.

As used herein, the phrase "wt. %" stands for weight percent.

One embodiment of the present invention is an emulsion copolymer copolymerized from a monomer mixture of (a) a monomer of the formula I

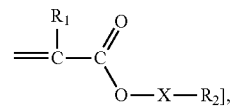

(b) one or more $C_4$ to $C_8$ alkyl (meth)acrylate, (c) one or more hard vinyl monomer, and (c) a phosphate surfactant. A monomer mixture to be used in one embodiment of the present invention is selected to give a desired Tg. The monomer components of the emulsion copolymer in accordance to the present invention should be selected such that the Tg of the dried copolymer is from −45° C. to 70° C., and, preferably, from −20° C. to 50° C. Polymers having Tg's above 0° C. may cause the resulting coating to lose flexibility at a low temperature. Polymers having Tg's of −50° C. or below may be prone to tacking, have low tensile strength, and cause colored chemicals to bleed-through from substrate into coatings, thereby deteriorating the performance of the coatings.

The emulsion copolymer preferably contains at least 0.3 wt. %, preferably 1.5 wt. %, of monomers of the formula I. In general, the amount of monomers of formula I should not exceed 3 wt. %, in particular 2.5 wt. %.

In the formula I, $R^1$ is a hydrogen atom or a methyl group, X is a divalent organic polyalkylene oxide group comprising from 1 to 50 alkylene oxide units, and $R^2$ is a hydrogen atom or an aliphatic or aromatic hydrocarbon group having 1 to 20 carbon atoms.

In one embodiment, X is preferably a polyalkylene oxide group comprising ethylene oxide units, propylene oxide units, or mixtures of ethylene oxide and propylene oxide units. Ethylene oxide units and propylene oxide units may alternate, for example, or may be present in the form of polyethylene oxide and/or polypropylene oxide blocks. The polyalkylene oxide group preferably comprises not more than 40, preferably not more than 30, more particularly preferably not more than 20, alkylene oxide units.

The polyalkylene oxide group preferably comprises at least two, preferably at least 3, and more preferably at least 4, alkylene oxide groups.

The radical $R^2$ is preferably a hydrogen atom or a hydrocarbon group having 1 to 10 carbon atoms; preferably, $R^2$ is a $C_1$ to $C_8$ alkyl group, in particular a $C_1$ to $C_4$ alkyl group, or a hydrogen atom. The monomer of the formula I can be QM-833 (from The Dow Chemical Company, Midland, Mich.) or MPEG-1005MA (from Evonik Company).

The $C_2$ to $C_8$ alkyl (meth)acrylate monomer is a soft monomer and may include, for example, ethyl acrylate (EA), 2-ethylhexyl acrylate (2-EHA), n-butyl acrylate (BA), isobutyl acrylate, octyl methacrylate, isooctyl methacrylate, decyl methacrylate (n-DMA), isodecyl methacrylate (IDMA), lauryl methacrylate (LMA), pentadecyl methacrylate, stearyl methacrylate (SMA), octyl acrylate, isooctyl acrylate, decyl acrylate, isodecyl acrylate, lauryl acrylate (LA), the ($C_{12}$ to $C_{15}$) alkyl methacrylates, cyclohexylacrylate, and cyclohexylmethacrylate. The soft monomer can be a substantially pure soft monomer, or a mixture of two or more such monomers.

Suitable hard vinyl monomers may include, for example, (meth)acrylic ester monomers including $C_1$ to $C_3$ alkyl (meth)acrylates, such as methyl methacrylate (MMA), ethyl (meth)acrylate, $C_1$ to $C_{20}$ cycloaliphatic (meth)acrylates such as isobornyl methacrylate and cyclohexyl methacrylate, vinyl aromatics such as styrene, alkylstyrenes (methyl and ethyl), and alpha methyl styrene, (meth)acrylonitrile, and (meth)acrylamide or substituted (meth)acrylamides.

To improve stability in aqueous systems, it is desirable to include into the emulsion copolymer of the present invention a small amount of an ethylenically unsaturated carboxylic acid group containing monomer, such as, for example, maleic acid or anhydride, itaconic acid or, preferably, methacrylic acid (MAA) and acrylic acid (AA). Preferably, the ethylenically unsaturated carboxylic acid group containing monomer is added in a polymer seed or in an initial charge to a polymerization reactor, thereby limiting any adverse impact on water swelling resistance.

Suitable ethylenically unsaturated sulfur containing acid functional monomers may include, for example, sodium styrene sulfonate (SSS) and (meth)acrylamidopropane sulfonate. Examples of suitable phosphorus acid monomers may include, for example, phosphoalkyl (meth)acrylates such as phosphoethyl methacrylate. The ethylenically unsaturated acids may be used in amounts of up to 1.2 wt. %, or, preferably, from 0.03 to 0.8 wt. %, based on the total dry weight of monomer mixture, and include monomers with sulfur and phosphorus acid functional groups.

To reduce gel content in the emulsion copolymer of the present invention (preferably keeping the gel content at around from 0.03 to 0.8 wt. %, based on the total dry weight of monomer mixture), one or more sulfur acid monomer, such as SSS, can be added to act as an in-process stabilizer. Such sulfur acid monomer may reduce gel formation during synthesis. Further, the addition of a sulfur acid monomer may further enhance polymerization.

Optionally, the aqueous emulsion copolymer of the present invention comprises one or more adhesion-promoting ethylenically unsaturated monomers. Other such suitable adhesion-promoting ethylenically unsaturated monomers include ureidoalkyl (meth)acrylates, ureidoalkyl (meth)acrylamides and other ureido group containing monomers such as, for example, those disclosed in U.S. Pat. No. 3,356,627.

In accordance to an embodiment of the present invention, at least one polymerizable surfactant is added into the monomer mixture of the present invention in amounts of up to 5 wt. %, preferably 0.3 to 3 wt. %, based on the total dry weight of monomer mixture, to act as stabilizing agent. Specifically, in one embodiment of the present invention, a phosphate surfactant, polyethylene glycol monotridecyl ether phosphate, such as RHODAFAC RS-610A25(P-12A) (from Rhodia) is preferably added to the monomer mixture. Other phosphate surfactants, including phosphate monomers such as phosphoethyl methacrylate (PEM), can be optionally added to achieve the same purpose.

Other suitable surfactants may include styrenated phenol sulfates, such as Hitenol™ BC-1025 (from Montello inc., Tulsa, Okla.), Aerosol™ NPES-930 (polyoxyethylene) nonylphenol (NP) ammonium sulfate (from Cytec Industries, Woodland Park, N.J.), ethoxylated styrenated phenol sulfates, such as E-Sperse™ RS-1596 and E-Sperse™ RS-1618 (from Ethox Chemicals, Greenville, S.C.), and sodium dodecylallyl sulfosuccinate such as TREM™ LF-40 (from Cognis, Cincinnati, Ohio).

The emulsion copolymer of the present invention can be prepared by emulsion polymerization techniques well known in the art for making emulsion copolymers from hydrophobic C2 to $C_{24}$ alkyl (meth)acrylate monomers. While not required, the polymerization of the emulsion copolymer of the present invention can be catalyzed by a redox initiation polymerization method, the polymerization also can be polymerized by the conventional thermal initiation polymerization method.

After the polymerization process is completed, the resulting emulsion copolymer of the present invention may have a weight average particle size of from 80 to 500 nm, such as, for example, a relatively large particle size of from 90 to 300 nm which improves adhesion and increases anti-stain of coatings or films. To achieve this weigh average particle size, emulsion polymerization methods for making emulsion copolymers of present invention will include, for example, polymerizing in the presence of from 0.01 to 1 wt. %, based on the total weight of monomers used to make the copolymer, of one or more surfactants, or, preferably, in the presence of small amounts of surfactant, such as, for example, from 0.01 to 0.4 wt. %, based on the total weight of monomers used to make the copolymer, preferably, 0.08 to 0.32 wt. %. More preferably, large particle size emulsion copolymers may be formed by polymerizing the monomer mixture under low shear during polymerization, thereby increasing the ion balance or salt concentration of the composition during the entire polymerization process.

Optionally, to control the molecular weight of the emulsion copolymer of the present invention, chain transfer agents, such as, for example, alkyl mercaptans, halogen compounds may be used. Preferably, the chain transfer agent is hydrophobic, such as n-dodecyl mercaptan (n-DDM or DDM) or any $C_4$ to $C_{18}$ mercaptan.

Preferably, to ensure that a high solids content in the aqueous compositions of the present invention, chain transfer agents (CTA) such as, for example, n-dodecylmercaptan should be used in an amount up to 0.01 wt. %, based on the total dry weight of monomer mixture, to 0.3 wt. %, or, more preferably, 0.2 wt. % or less, or, more preferably, 0.1 wt. %, or less. Use of such low amount of the CTA in an emulsion copolymer avoids possible increase in water swelling or a decrease in elongation abilities.

In one example of a suitable emulsion polymerization method in accordance to the present invention, the monomer mixture is gradually added into the reaction chamber in one continuous step to form an emulsion copolymer. In another example of a suitable emulsion polymerization method in accordance to the present invention, the monomer mixture is added into the reaction chamber in two stages. During the first stage of monomer addition, the amount of soft monomer (i.e., C2 to $C_8$ alkyl (meth)acrylate such as 2-EHA) in the monomer mixture is substantially equal to the amount of hard vinyl monomer (such as ST or MMA). Thereafter, during the second stage of monomer addition, the weight ratio between the amount of soft monomer and hard vinyl monomer is substantially 7 to 3.

The aqueous coating compositions of the present invention may comprise 15 to 65 wt. % of emulsion copolymer solids, preferably, 40 wt. % or more, or, more preferably, 50 wt. % or more, based on the dry weigh of all components, including any fillers, extenders and pigments and any other solid additive present in a coating or film.

In one embodiment of the present invention, the solids level of aqueous coating compositions may range 15 wt. % or higher and up to 80 wt. %, preferably, 40 wt. % or higher, or, more preferably, 50 wt. % or higher, or, even more preferably, 60 wt. % or higher.

Preferably, the aqueous composition for coating roofing substrates of the present invention have a VOC content of 100 g/L or less, and preferably, 50 g/L or less.

The aqueous compositions of the present invention can have a % PVC of from 20 to 70 or, preferably, 30 to 50, or, more preferably, from 35 to 45. Total volumes of pigment, extender and/or opacifier in excess of 50% PVC will impair anti-stain performance of paint film. Suitable pigments may be, for example, titanium dioxide, hollow sphere or void containing or polymer pigments, or iron oxides. Suitable extenders may be, for example, calcium carbonate, clay, mica, talc, alumina silicates, aluminum trihydrate, nepheline syenite or mixtures of any of these with other extenders. In one embodiment, clearcoat compositions may be formulated with extenders and no pigments.

Compositions of the present invention may also comprise one or more hydrophilic polymeric dispersant, such as a polymethacrylic acid, or a polyacid salt, such as alkali(ne) metal salt, and polyMAA and its sodium salt. Any hydrophilic dispersant that can stabilize pigments, extenders and/or fillers and wet out substrate surface may be used. Some examples are: copolymer dispersants such as Tamol™ 851 (Na poly(MAA)) or 1124 (poly(AA-co-hydroxypropyl acrylate)) (from Dow Chemical, Midland, Mich.), or Orotan™ 1288 (from Dow Chemical, Midland, Mich.), or Orotan™ 731A (from Dow Chemical, Midland, Mich.), Rhodoline™ 286N dispersants (from Rhodia, Cranbury, N.J.), hydrophilic copolymer acid salts, alkali soluble polymer or resin salts, and phosphoethyl methacrylate (PEM) polymer and copolymer dispersants. To avoid excessive water sensitivity, and possible loss of adhesion, hydrophilic dispersants should be used in amounts of 2 wt. % or less, based on the dry weight of total pigment, filler and extender solids present in the composition.

To reduce tacking in coatings made therefrom, the compositions of the present invention may comprise one or more tacking-reducing compound, such as a multivalent metal ion or ion containing compound, oxide, hydroxide and/or salt. Multivalent metal ions such as calcium, magnesium, zinc, aluminum, iron, tungsten, zirconium, barium and strontium ions, are known to have anti-tacking properties. Complexes of multivalent metal ions, such as zinc hexammonium, zinc ammonium carbonate, and zirconium ammonium carbonate, and salts of multivalent metal ions with counter-ions, such as chloride, acetate, bicarbonate and the like, may be used to supply the ions. Oxides or hydroxides, such as those of zinc or zirconium may be used. As discussed above, zinc is the most commonly used multivalent metal ion.

Preferably, improved adhesion is observed in coatings made from compositions comprising one or more hydrolysable silanes or alkoxy silanes, which preferably have two or three hydrolysable groups. Suitable amounts of epoxysilane, aminosilane, vinyl alkoxysilane are the same. Combinations of the epoxysilanes and aminosilanes may be used. Suitable aminosilanes may comprises an amino-alkyl functional group and is hydrolysable, having, for example, one or more alkoxy group or aryl(alkyl)oxy functional group. Preferably, the amino silane has two or more amino functional groups and two or, more preferably, three hydrolysable groups, i.e. tri-alkoxy. One such example is an epoxy functional silane oligomer such as Momentive™ CoatOSil™ MP 200 (from Momentive Performance Materials, Albany, N.Y.). Other examples are of aminosilanes include Momentive™ Silquest™A-1120 (both from Momentive Performance Materials, Albany, N.Y.) or Dow-Corning Z-6020 (from Dow Corning, Midland, Mich.), each of which are aminoethylaminopropyl trimethoxysilanes. Other suitable silanes include, for example, Momentive™ Silquest™A-174 which is methacryloxypropyltrimethoxysilane, A-187 which is γ-(2,3-epoxypropoxy)propytrimethoxysilane, Dow Corning Z-6040 (from Dow Corning, Midland, Mich.), which is glycidoxypropy trimethoxysilane, and Silquest Wetlink™ 78 (from Momentive Performance Materials, Albany, N.Y.), a glycidoxypropylmethyl diethoxysilane.

Silanes may be used in amounts ranging from 0.2 wt. % or more, or up to 2.0 wt. %, preferably, 0.5 wt. % or more, or, preferably 1.5 wt. % or less, or, more preferably, 0.7 wt. % or more, based on the total dry weight of the emulsion copolymer. To formulate the coating compositions of the present invention with a silane, the silane can be added with stirring, such as overhead stirring, preferably before pigments, fillers or extenders are added.

The aqueous compositions of the present invention for coating substrates may additionally comprise one or more thickeners, such as hydroxyethylcellulose (HEC) or modified versions thereof. The aqueous compositon sof the present invention may further comprise UV absorbers, coalescents, wetting agents, rheology modifiers, drying retarders, plasticizers, biocides, mildewicides, defoamers, colorants, waxes, and silica.

The compositions of the present invention are preferably used as coatings, as a paint formulation.

The compositions of the present invention may be applied to a wide variety of weathered and unweathered substrates, such as, for example, mineral substrates such as plasters or concrete, wood, metal or paper. The substrates onto which the compositions of the present invention can be applied also include interior coatings, asphaltic coatings, roofing felts, synthetic polymer membranes, foamed polyurethane, for example, spray polyurethane foam, and metals, such as aluminum; or to previously painted, primed, undercoated, worn, or weathered substrates, such as metal roofs weathered TPO, weathered silicone rubber and weathered EPDM rubber. Other suitable substrates include modified bitumen membrane.

Preferably, substrates can be prepared for coating with cleaning or treatment by physical abrasion, flame ionization, powerwashing with water, applying an aqueous cleaning solution, such as, for example, from 5 to 10 wt. % trisodium phosphate, or other cleaning agents, followed by powerwashing with water, or plasma treatment prior to coating.

EXAMPLES

The following examples illustrate the advantages of the present invention. Unless otherwise stated, all conditions are standard pressure and room temperature.

Table 1 below lists the raw materials used for preparation of Examples in accordance with one embodiment of the present invention. Table 1(a) below includes the chemicals used to prepare the emulsion copolymer in accordance to the present invention. Table 1(a) also shows the acronyms for these chemicals, the function for each material, and the commercial supplier from which these materials could be obtained. Table 1(b) below shows the materials used for a coating formulation prepared using the emulsion copolymer of Table 1(a).

TABLE 1(a)

Raw Materials Used to Make the Emulsion Copolymer in Example 1

| Raw material | Function | Supplier |
|---|---|---|
| Polyethylene glycol monotridecyl ether phosphate, RS-610A25 (P-12A) | Surfactant | Rhodia |
| 2-Ethylhexyl acrylate, 2-EHA | Soft monomer | Dow Chemical |
| Ethyl acrylate, EA | Hard monomer | Dow Chemical |
| Polyalkylene oxide lauryl methacrylate, QM-833 | Functional monomer | Dow Chemical |
| Polyethylene glycol methacrylate, MPEG-1005 MA | Functional monomer | Dow Chemical |
| Methacrylic acid, MAA | Functional monomer | Dow Chemical |
| Allylmethacrylate, ALMA | Functional monomer | Dow Chemical |
| Acrylic acid, AA | Functional monomer | Dow Chemical |
| Sodium styrene sulfonate, SSS | Functional monomer | Dow Chemical |
| Epoxy functional silane oligomer, CoatOSil MP 200 | Functional monomer | Momentive |

TABLE 1(b)

Raw Materials Used to Make the Paint Formulation That Was Used As Example 1

| Material: Trade Name (Chemical Name) | Kilogram |
|---|---|
| Grind | |
| Water | 200.00 |
| Orotan ™ 1288 (dispersant in DOW) | 2.50 |
| Triton EF-106 (APEO free surfactant in DOW) | 1.00 |
| AMP-95 (2-amino-2-methyl-1-propanol) | 0.25 |
| Cellusize QP-30000H (thickener in Union Carbide) | 2.00 |
| Dispelair CF-246 (defoamer agent in Blackburn) | 1.00 |
| Pigment: Ti-Pure R-706 ™ (Titanium dioxide) | 260.00 |
| CC-700 (Calcium carbonate) | 20.00 |
| DB-80 (Kaolin) | 115.00 |
| LetDown | |
| Emulsion: Copolymer A (Acrylic Latex) | 320.00 |
| Ropaque Ultra E | 20.00 |
| Foamaster NXZ | 0.50 |
| Acrysol RM-2020 NPR | 3.00 |
| Acrysol TT-935 | 1.50 |
| AMP—95 | 0.83 |
| Kathon LX 1.5% | 1.00 |
| Water | 31.42 |
| COASOL | 19.00 |
| Totals => | 1000.00 |
| Volume Solids | 38.17% |
| Density: | 1.4213 Kg/L |
| Weight Solids: | 56.10% |

Example 1

360 grams of deionized (DI) water was charged into a container. Thereafter, 120 grams of RS-610A25 (P-12A) surfactant, 570 grams of styrene, 116 grams of 2-EHA, 890 grams of EA, 47.3 grams of QM-833, 19 grams of MAA, and 5 grams of ALMA, were added into the container at room temperature, to form a monomer emulsion mixture.

In a 5 liter reactor equipped with a mechanical stirrer, thermocouple, condenser, and stainless steel feed ports, 750 grams of DI water was added and heated to 90 degree Celsius in a nitrogen atmosphere. With the DI water at 90 degree Celsius, the following materials were added into the reactor: 4 grams of RS-610A25 (P-12A) surfactant, 1.6 grams of sodium carbonate. The mixture being formed in the reactor is mixed for 1 minute and constitutes a seeding solution.

After the seeding solution is formed in the reactor, the monomer emulsion mixture in the container was added to the reactor at 17.4 gm/minute by using the FMI (Fluid Meter Incorporated) pump. After approximately 60 minutes, or until half of the monomer emulsion mixture was added into the reactor, 33 grams of QM 1458 was added.

Thereafter, the remaining monomer emulsion mixture is added into the reactor. Throughout the addition process, which lasts approximately 120 minutes, the reactor temperature was maintained at between 87 to 89 degree Celsius. The reactor agitation rate was set at to 300 RPM.

After the monomer emulsion mixture was fed into the reactor, hold for 2 h. Then, 7.2 grams of neutralizer, such as NaOH was added slowly into the reactor until the pH reaches between 7.5 to 8.5. Optionally, small amounts of biocides and defoamers were added into the reactor.

Thereafter, the cooling process of the reactor begins. Once the reactor has cooled to 30 degrees Celsius, the contents of the reactor was discharged and filtered through a 150 micron (#100 Mesh) sieve and a 45 micron (#325 Mesh) sieve. The resulting emulsion has the following properties: 50.5% solids, pH at 7.8, and particle size of 135 nm (measured using BI90 Plus).

After the emulsion polymer was prepared, it was incorporated into a paint formulation by using well known procedures with materials shown in Table 1(b).

Example 2

An emulsion polymer was prepared as described in Example 1 above, except that instead of adding QM-833 functional monomer to form the monomer emulsion mixture, 33 grams of MPEG-1005MA monomer was used.

Comparative Example 1

An emulsion polymer was prepared as described in Example 1 above, except that no QM-833 monomer was added as part of the monomer emulsion mixture.

Comparative Example 2

An emulsion polymer was prepared as described in Example 1 above, except that no QM-833 monomer was added as part of the monomer emulsion mixture and, instead of adding RS-610A25 (P-12A) surfactant into the reactor, 57.9 grams of AEROSOL A-102 surfactant was added.

Comparative Example 3

An emulsion polymer was prepared as described in Example 1 above, except that adding QM-833 monomer as part of the monomer emulsion mixture, 33 grams of MPEG monomer was added. Also, instead of adding RS-610A25 (P-12A) surfactant into the reactor, 112 grams of A-19 surfactant was added.

Evaluation of Examples

Test Methods: The following test methods are used in the analyses of the Examples and the Comparative samples.

(1) Stain Removal Test:

Stain removal ability was tested by using GB/T9780-2013. Thin films of test sample are casted on black vinyl scrub charts using a drawdown bar. The test samples are cured for seven days under controlled conditions, before stains are applied. Test area consists of 25 mm high and 100 mm wide. Within the test area, six types of stains (vinegar, black tea, ink, water black, and alcohol black, Vaseline black) are applied on the sample paint film.

Liquid stains are applied over gauze to prevent the stain material from running off from the test area. Stains stayed on the panel for two hours before excess stain is wiped off with dry tissue. The test panel is then placed on a scrub tester with a 1.5 kg weight, with a scrubbing cycle of 37 scrubs per minute. After the test panel is scrubbed for 200 cycles, it is removed from the tester, rinsed under running water, and hung up for drying.

The cleaned stain area is being evaluated by measuring the change of reflection index (X) using the formula below:

$$X = \frac{Y_1}{Y_0} \times 100$$

$Y_1$=Reflection index after stain removal test; $Y_2$=Reflection index before stain removal test.

Based on the reflection index value X, the total stain removal score R was calculated by using the following scoring table:

| R | Vinegar | black tea | ink | water black | alcohol black | Vaseline black |
|---|---|---|---|---|---|---|
| 10 | 99 < X ≤ 100 | 98 < X ≤ 100 | 96 < X ≤ 100 | 96 < X ≤ 100 | 95 < X ≤ 100 | 99 < X ≤ 100 |
| 9 | 98 < X ≤ 99 | 95 < X ≤ 98 | 91 < X ≤ 96 | 91 < X ≤ 96 | 89 < X ≤ 95 | 98 < X ≤ 99 |
| 8 | 97 < X ≤ 98 | 91 < X ≤ 95 | 85 < X ≤ 91 | 85 < X ≤ 91 | 82 < X ≤ 89 | 97 < X ≤ 98 |
| 7 | 96 < X ≤ 97 | 86 < X ≤ 91 | 78 < X ≤ 85 | 78 < X ≤ 85 | 74 < X ≤ 82 | 96 < X ≤ 97 |
| 6 | 95 < X ≤ 96 | 80 < X ≤ 86 | 70 < X ≤ 78 | 70 < X ≤ 78 | 65 < X ≤ 74 | 95 < X ≤ 96 |
| 5 | 93 < X ≤ 95 | 73 < X ≤ 80 | 61 < X ≤ 70 | 61 < X ≤ 70 | 55 < X ≤ 65 | 93 < X ≤ 95 |
| 4 | 90 < X ≤ 93 | 65 < X ≤ 73 | 51 < X ≤ 61 | 51 < X ≤ 61 | 44 < X ≤ 55 | 90 < X ≤ 93 |
| 3 | 86 < X ≤ 90 | 56 < X ≤ 65 | 40 < X ≤ 51 | 40 < X ≤ 51 | 32 < X ≤ 44 | 86 < X ≤ 90 |
| 2 | 81 < X ≤ 86 | 46 < X ≤ 56 | 28 < X ≤ 40 | 28 < X ≤ 40 | 19 < X ≤ 32 | 81 < X ≤ 86 |
| 1 | X ≤ 81 | X ≤ 46 | X ≤ 28 | X ≤ 28 | X ≤ 19 | X ≤ 81 |

Thereafter, the total stain removal score (R') was calculated by using the formula below:

$$R' = \frac{\sum_{i=1}^{n=6} R_i}{n} \times 10.$$

Wherein, Ri are the stain removal scores for different stains. In China, the premium standard of stain removal is 60 points according to the new GB test method. A high stain removal score shows a better stain resistance property.

(2) Brush Clogging Test

A test sample was prepared by mixing 100 g of the testing paint and 20 g of water. Pour the mixture into a can. Next, place a woolen brush into the can and place the can in an oven at 40 degree Celsius for 2 hours. After brushing the heated brush on a board, place the woolen brush back into the paint can. The above steps complete once cycle.

Repeat the above test cycle and, at every cycle, make a note of the cycle number if brush clogging has been observed. After 5 cycles, wash the brush gently by hand using water. If the brushes were not clogged or hardened and there is no precipitation observed inside the brush, then note the clogging test result as "pass," otherwise, mark as "fail."

Results

Table 1 below compares the evaluation results for the analyses that have been performed on Examples 1 and 2 (compositions of the present invention) and Comparative Examples 3, 4, and 5.

|  | Example 1 | Example 2 | Comparative Example 1 | Comparative Example 2 | Comparative Example 3 |
|---|---|---|---|---|---|
| Stain Resistance Score | 63 | 60 | 65 | 53 | 45 |
| Brush Clogging | Pass | Pass | Fail | Pass | Pass |

As shown in Table 1, when comparing to Comparable Examples 1, 2 and 3, Examples 1 and 2 shows overall superior stain resistance and brush clogging properties. For Comparative Example 1, although it also shows superior stain resistance property, it however showed some signs of brush clogging. For Comparative Example 2, even though it passed the brush clogging test, it showed poor stain resistance. Likewise, for Comparative Example 3, although it showed good anti-clogging properties, it demonstrated poor stain resistance.

We claim:

1. An aqueous composition for coating substrates comprising:
   (i) one or more emulsion copolymer being a copolymerization product of a monomer mixture comprising a monomer of formula I,

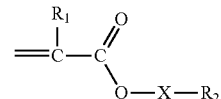

wherein R₁ is hydrogen or methyl, X is a divalent organic alkylene oxide group, and R₂ is hydrogen or an aliphatic or aromatic hydrocarbon group having from 1 to 20 carbon atoms, and (ii) a phosphate surfactant that is a polyethylene glycol monotridecyl ether phosphate.

2. The aqueous composition as claimed in claim 1, wherein the divalent organic alkylene oxide group comprises ethylene oxide units, propylene oxide units, or mixtures of ethylene oxide and propylene oxide units.

3. The aqueous composition as claimed in claim 1, wherein the monomer mixture contains at least 0.3 wt. % of monomers of the formula I.

4. The aqueous composition as claimed in claim 1, wherein the monomer mixture further comprises one or more C2 to C8 alkyl (meth)acrylates.

5. The aqueous composition as claimed in claim 1, wherein the monomer mixture further comprises one or more hard vinyl monomers.

6. The aqueous composition as claimed in claim 5, wherein the hard vinyl monomer is a (meth)acrylic ester monomer.

7. The aqueous composition as claimed in claim 1, wherein the monomer mixture further comprises one or more ethylenically unsaturated monofunctional carboxylic acid group containing monomer.

8. The aqueous composition as claimed in claim 1, wherein the phosphate surfactant comprises from 0.3 to 3 wt. % based on the total dry weight of the aqueous composition.

9. The aqueous composition as claimed in claim 1, wherein the phosphate surfactant further comprises phosphoethyl methacrylate.

10. The aqueous composition as claimed in claim 1, wherein the monomer mixture further comprises one or more adhesion promoting ethylenically unsaturated monomer.

11. The aqueous composition as claimed in claim 1, wherein the monomer mixture contains at least 2 wt. % of monomers of the formula I.

12. The aqueous composition as claimed in claim 1, wherein R₂ of the monomer of formula I is an aliphatic group having from 1 to 20 carbon atoms.

13. An pigmented coating material comprising:
(i) one or more emulsion copolymer, the emulsion copolymer being a copolymerization product of a monomer mixture comprising a monomer of formula I,

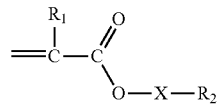

wherein R₁ is hydrogen or methyl, X is a divalent organic alkylene oxide group, n is an integer ranging from 1 to 50 and R₂ is hydrogen or an aliphatic or aromatic hydrocarbon group having from 1 to 20 carbon atoms, (ii) a phosphate surfactant that is a polyethylene glycol monotridecyl ether phosphate, and (iii) a combination of one or more of a pigment, extender, filler and mixtures thereof with one or more hydrophilic polymeric dispersant in a total amount so that the composition has a pigment volume concentration (% PVC) of from 20 to 70.

14. The coating material as claimed in claim 13, wherein the divalent organic alkylene oxide group comprises ethylene oxide units, propylene oxide units, or mixtures of ethylene oxide and propylene oxide units.

15. The coating material as claimed in claim 13, wherein the monomer mixture further comprises one or more C2 to C8 alkyl (meth)acrylates.

16. The coating material as claimed in claim 13, wherein the monomer mixture further comprises one or more hard vinyl monomers.

17. The coating material as claimed in claim 16, wherein the hard vinyl monomer is a styrene or (meth)acrylic ester monomer.

18. The coating material as claimed in claim 13, wherein the phosphate surfactant further comprises phosphoethyl methacrylate.

19. A method of making a composition for coating substrates comprising:
forming a copolymer, using emulsion polymerization, from a monomer mixture comprising, based on the total dry weight of the monomer mixture,
(a) 0.3 wt. % to 3 wt. % of a monomer of the formula I

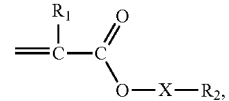

wherein R₁ is hydrogen or methyl, X is a divalent organic alkylene oxide group, n is an integer ranging from 1 to 50 and R₂ is hydrogen or an aliphatic or aromatic hydrocarbon group having from 1 to 20 carbon atoms,
(b) a hard monomer comprising one more styrene or vinyl aromatic monomer or C1 to C8 alkyl (meth)acrylates,
(c) a soft monomer comprising C2 to C8 acrylate or alkyl acrylate, and
(d) 0.3 wt. % to 3.0 wt % of a phosphate surfactant that is a polyethylene glycol monotridecyl ether phosphate;
wherein the Tg of the dried copolymer is from −20° C. to 50° C.;
combining the copolymer with a reductant and a combination of one or more of a pigment, extender, filler and mixtures thereof, and one or more hydrophilic polymeric dispersant, so that the aqueous composition has a pigment volume concentration (% PVC) of from 20 to 70.

* * * * *